United States Patent
Theobald

(10) Patent No.: US 11,904,225 B2
(45) Date of Patent: Feb. 20, 2024

(54) SCORE ACTIVATED CORNHOLE LIGHT INSERT

(71) Applicant: Sefton Buckland Theobald, Denver, CO (US)

(72) Inventor: Sefton Buckland Theobald, Denver, CO (US)

( * ) Notice: Subject to any disclaimer, the term of this patent is extended or adjusted under 35 U.S.C. 154(b) by 336 days.

(21) Appl. No.: 17/386,469

(22) Filed: Jul. 27, 2021

(65) Prior Publication Data

US 2022/0032157 A1 Feb. 3, 2022

Related U.S. Application Data

(60) Provisional application No. 63/058,113, filed on Jul. 29, 2020.

(51) Int. Cl.
| | |
|---|---|
| *A63B 63/00* | (2006.01) |
| *A63B 71/06* | (2006.01) |
| *A63B 67/06* | (2006.01) |
| *G01V 8/12* | (2006.01) |
| *H05B 47/115* | (2020.01) |
| *G08B 5/38* | (2006.01) |
| *H05B 45/10* | (2020.01) |

(52) U.S. Cl.
CPC .......... *A63B 71/0605* (2013.01); *A63B 67/06* (2013.01); *G01V 8/12* (2013.01); *G08B 5/38* (2013.01); *H05B 45/10* (2020.01); *H05B 47/115* (2020.01); *A63B 2071/0694* (2013.01); *A63B 2225/74* (2020.08)

(58) Field of Classification Search
None
See application file for complete search history.

(56) References Cited

U.S. PATENT DOCUMENTS

| | | | |
|---|---|---|---|
| 7,854,528 B2 | 12/2010 | Segretto et al. | |
| 10,226,675 B2 | 3/2019 | Wilder | |
| 10,401,020 B2 | 9/2019 | Finch et al. | |
| 10,953,295 B2 | 3/2021 | Modlin | |
| 2015/0054221 A1 | 2/2015 | Sandman et al. | |

(Continued)

OTHER PUBLICATIONS

Just_Great_Values.pdf—found at: https://justgreatvalues.com/cornhole-sound-machines/, Published or on sale at least as of Feb. 19, 2019.

(Continued)

*Primary Examiner* — Sunit Pandya
(74) *Attorney, Agent, or Firm* — Stanley J. Gradisar Attorney At Law, LLC; Stanley J. Gradisar

(57) ABSTRACT

The score activated cornhole light insert is a lighting accessory that can be built into an originally manufactured cornhole board, or retrofitted into existing cornhole boards. The scoring hole with the insert in place will maintain the regulation six-inch inner diameter. The insert has adjustable mounting brackets to position the top of the insert flush with the cornhole board to prevent interference with game play or cornhole rule and regulations. The insert detects when a media filled bag has passed through the scoring hole, triggering a distinctive light pattern. In addition, the insert will indicate the battery level with a series of different blinking speeds during the first few moments of operation. The insert is watertight and designed to prevent false positives when a media filled bag lies partly on the cornhole board and partly over the scoring hole by lowering an infrared break beam below the board top surface.

9 Claims, 11 Drawing Sheets

(56) References Cited

U.S. PATENT DOCUMENTS

2020/0391095 A1  12/2020  Michael
2021/0031092 A1   2/2021  Jones
2021/0038958 A1   2/2021  Kowtko

OTHER PUBLICATIONS

LED_Light_Cornhole_Board_Upgrade_LED_Lights_Cornhole_Boards_Etsy.pdf—found at: https://www.etsy.com/listing/662668155/led-light-cornhole-board-upgrade-led?gpla=1&gao=1&&utm source=google&utm medium=cpc&utm campaign=shoppin, Published or on sale at least as of Jul. 11, 2020.
Amazon-com_Cornhole_Lights_Set.pdf—found at: https://www.amazon.com/Cornhole-Multicolor-Changing-Standard-Mounting/dp/B07PYP8533, Published or on sale at least as of Jun. 7, 2020.
Amazon-com_Blinngo_Cornhole_LED_Light.pdf—found at: https://www.amazon.com/Blinngo-Cornhole-Standard-Backyard-Long-Lasting/dp/B01N9SA7BG?th=1, Published or on sale at least as of Jun. 20, 2017.
Amazon-com_GoSports-Cornhole-Light-Up.pdf—found at: https://www.amazon.com/GoSports-Cornhole-Light-LED-Ring/dp/B06XFXZFVW2th=1, Published or on sale at least as of Jun. 15, 2017.

SCORE ACTIVATED CORNHOLE LIGHT INSERT

CROSS-REFERENCES TO RELATED APPLICATIONS

This application claims the benefit of U.S. Provisional Application Ser. No. 63/058,113 filed on Jul. 29, 2020 titled "SCORE ACTIVATED CORNHOLE LIGHT INSERT" which is incorporated herein by reference in its entirety for all that taught and disclosed therein.

BACKGROUND

The invention relates to yard, event, and competitive league games. More specifically, the invention relates to the game of cornhole, in which teams or individuals take turns tossing media filled bags at boards that are inclined towards the player with the front resting on the ground and the back of the board elevated about a foot off the ground. The boards have a regulation six-inch diameter hole with the center of the hole nine inches down from the top edge of the board and centered from left to right. Players or teams stand a determined distance from each other, and while facing each other, take turns tossing the bags back and forth at the cornhole game boards. The objective of the game is to score points by either landing a bag on the board or by passing it through the hole with the latter being worth more points. More specifically yet, the invention relates to a lighting accessory that can enhance the game play.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The present invention comprises multiple qualities that are tailored to the game of cornhole. The score activated cornhole light insert can either be incorporated into the production of a cornhole board, or, retrofitted as an accessory after the construction of a homemade board. The features of the score activated cornhole light insert are as follows.

First, the score activated cornhole light insert is designed to sit flush with the top of the cornhole game board (regardless of the board thickness) so as not to create any interference during a player's throw, while also maintaining the regulation size hole of six inches in diameter. Second, a blinking pattern of light is activated when a player throws a bag through the score hole. Third, a constant background light can be faded from "Off" to full brightness as a visual enhancement in between, and in tandem with, score activations. Fourth, a set of differentiated blinking speeds to indicate the battery power level occurs within the first few seconds of powering the unit on. Fifth, the score activated cornhole light insert is watertight so as to not be damaged by rain or any spilled liquids. Sixth, the score activated cornhole light insert is designed to prevent false positives when the bags slide across the score hole without completely falling into the hole. Lastly the score activated cornhole light insert is programed to turn off after a set amount of inactivity in order to save electrical power.

BRIEF DESCRIPTION OF THE SEVERAL VIEWS OF THE DRAWINGS

Some embodiments of the present invention are depicted as one example of the score activated cornhole light insert and not limited to the figures, parts, or ratings depicted nor are intended to be in any way limiting of the score activated cornhole light insert. Furthermore, some elements from figure to figure are removed to provide better visual clarity of the diagrams.

Figure 1:
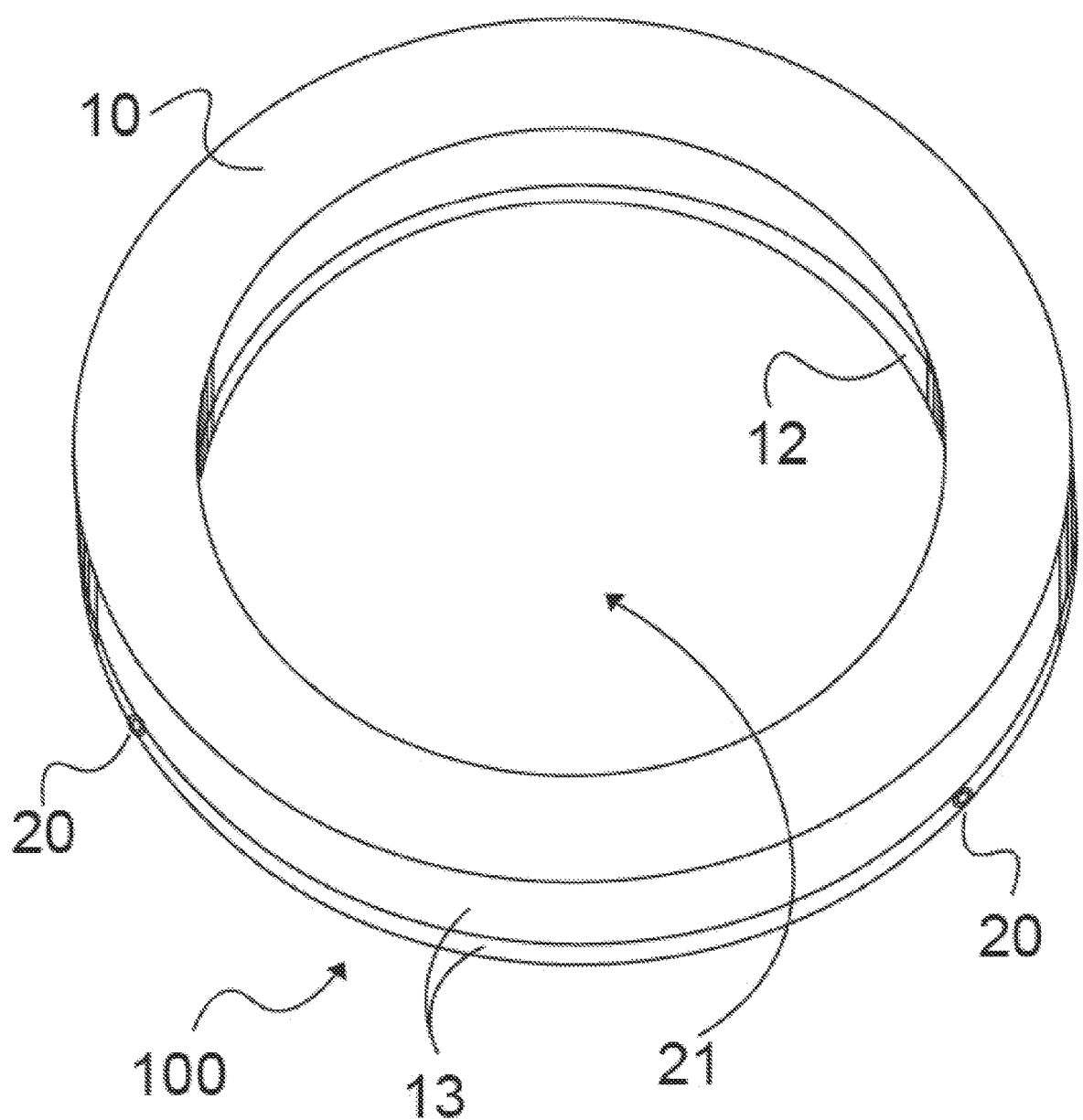
FIG. 1 shows a top perspective view of an embodiment of the score activated cornhole light insert.

To assist in the understanding of the present disclosure the following list of components and associated numbering found in the drawings is provided herein:

| TABLE OF COMPONENTS | |
|---|---|
| Component | # |
| Circular Body | 10 |
| Circular Lid | 12 |
| Toroid Body | 13 |
| Power Supply | 14 |
| Body Gaskets | 16 |
| Watertight Threaded Insert | 20 |
| Score Hole | 21 |
| Mounting Bracket | 22 |
| Machine Screw | 24 |
| Mounting Bracket Screw Holes | 26 |
| Height Adjustment Slot | 28 |
| Power Switch | 30 |
| Static Fade Dial | 32 |
| Infrared LED | 40 |
| Infrared Phototransistor | 42 |
| Infrared Break Beam | 44 |
| Bag | 45 |
| Infrared Phototransistor Bracket | 46 |
| Infrared Glare Filter Tunnel | 48 |
| Clear Break Beam Sight Window | 49 |
| LED's | 50 |
| Microcontroller/Components | 52 |
| Cornhole Game Board | 60 |
| Electrical Schematic | 70 |

-continued

TABLE OF COMPONENTS

| Component | # |
| --- | --- |
| Infrared Containing Sunrays | 90 |
| Score Activated Cornhole Light Insert | 100 |

DETAILED DESCRIPTION

The referenced components and terminology used herein are for the purpose of illustrating one embodiment of the score activated cornhole light insert and is not intended to be limiting of the invention. Unless otherwise defined, all terminology used herein has the same meaning as commonly used by one having ordinary skill in the art within the field of the invention. The present invention will now be described with reference to the figures and the figure elements.

Referring now to the Figures, like reference numerals and names refer to structurally and/or functionally similar elements thereof, and if objects depicted in the figures that are covered by another object, as well as the tag line for the element number thereto, may be shown in dashed lines. FIG. 1 shows a top perspective view of an embodiment of the score activated cornhole light insert 100 with respect to the circular body 10, the circular lid 12, and the watertight threaded inserts 20, which are utilized by the mounting hardware. The circular body 10 and the circular lid 12 form a toroid body 13 and the hole formed by the inner surface of the toroid body 13 form a score hole 21 when score activated cornhole light insert 100 is affixed to a cornhole game board 60 (see FIG. 9). Both the circular body 10 and the circular lid 12 have outer walls and inner walls that mate with each other and are cast from any type of clear or tintable casting agent, such as a two-part epoxy resin, plastic resin, or urethane in order to allow light from the LEDs 50 (see FIG. 2) to pass through while also not impeding upon the infrared break beam 44 (see FIG. 5), which will be discussed in more detail in further figures. While it is possible to use RGB LEDs (LEDs that contain a red, a green, and a blue diode that can each be each be individually powered in order to replicate any color by means of combining the different light frequencies), it has been determined that tinting the circular body 10 and the circular lid 12 different colors and using clear white LEDs is an optimal means of displaying different light colors for different units. This increases the ease of production (i.e., not requiring different resistor values per different color LEDs), allows for a great array of colors to be achieved, and allows the aesthetics of the score activated cornhole light insert 100 to match an existing board even when no light is being emitted. The circular body 10, the circular lid 12, and the body gaskets 16 that align with the inner walls and outer walls of the circular body 10 and the circular lid 12 (see FIG. 5) are screwed together to form a watertight structural seal, with the microcontroller/components 52 mounted within. Other methods besides utilizing screws may be employed to attach the circular body 10 and the circular lid 12 together, such as releasable clamps. The microcontroller/components 52 and mounting hardware will be discussed in more detail in further figures.

Figure 2:
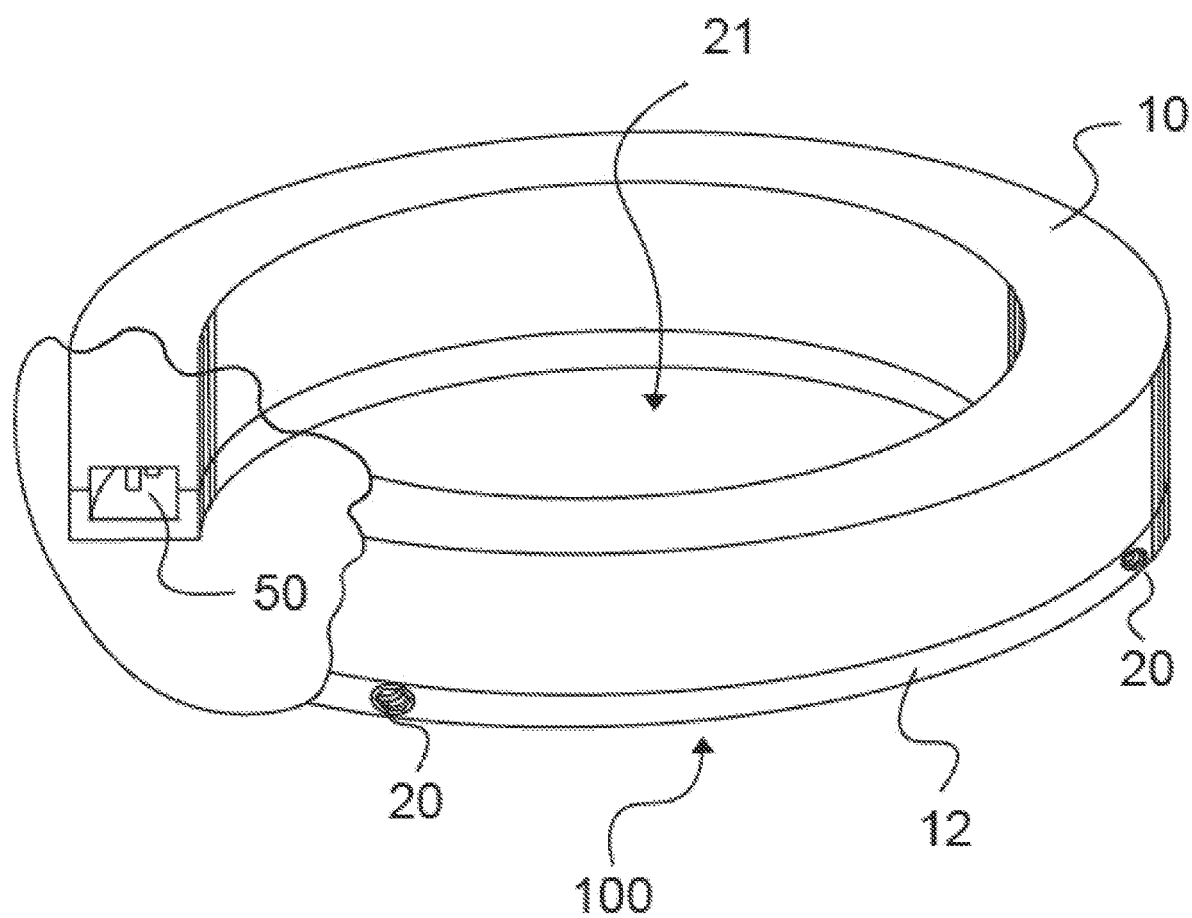
FIG. 2 shows a perspective and partial cross-sectional view of an embodiment of the score activated cornhole light insert.

FIG. 2 shows a perspective and partial cross-sectional view of an embodiment of the score activated cornhole light insert 100 with respect to the circular body 10, the circular lid 12, the watertight threaded inserts 20, and the LEDs 50.

Referring now to FIG. 2, the LEDs 50 are mounted in such a way that the light emitted will be directed away from the circular lid 12, up through and towards the top side of the circular body 10.

Figure 3:
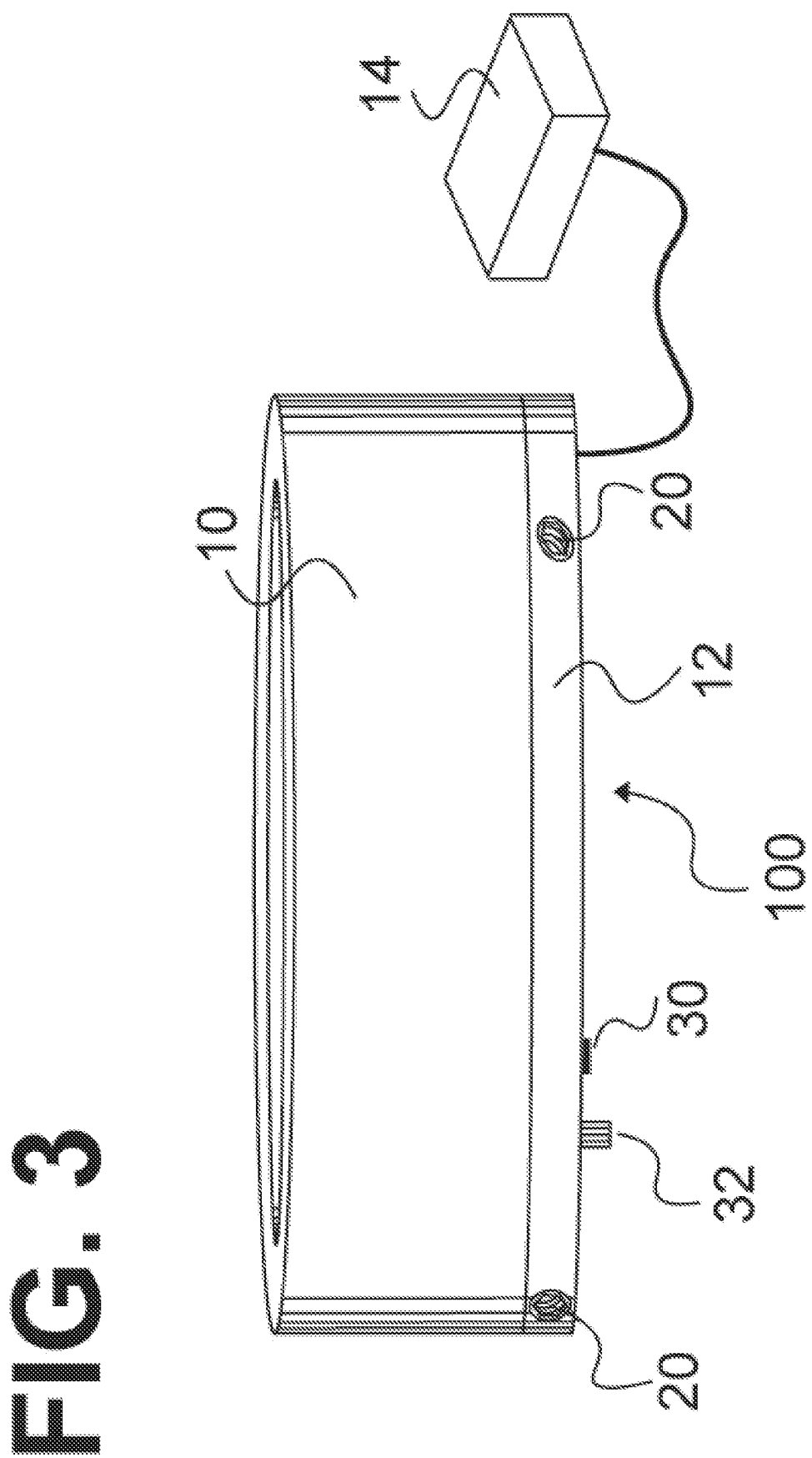
FIG. 3 shows a perspective side view of an embodiment of the score activated cornhole light insert.

FIG. 3 shows a perspective side view of an embodiment of the score activated cornhole light insert 100 with respect to the circular body 10, the circular lid 12, the watertight threaded inserts 20, the power switch 30, the static fade dial 32, and the power supply 14. The power switch 30 is limited to an "On" or "Off" position, while the static fade dial 32 is a potentiometer that will allow the users to set the LEDs 50 to a constant background light of desired brightness ranging from zero illumination to full illumination and any brightness level in between, and in conjunction with scoring activations.

Figure 4:
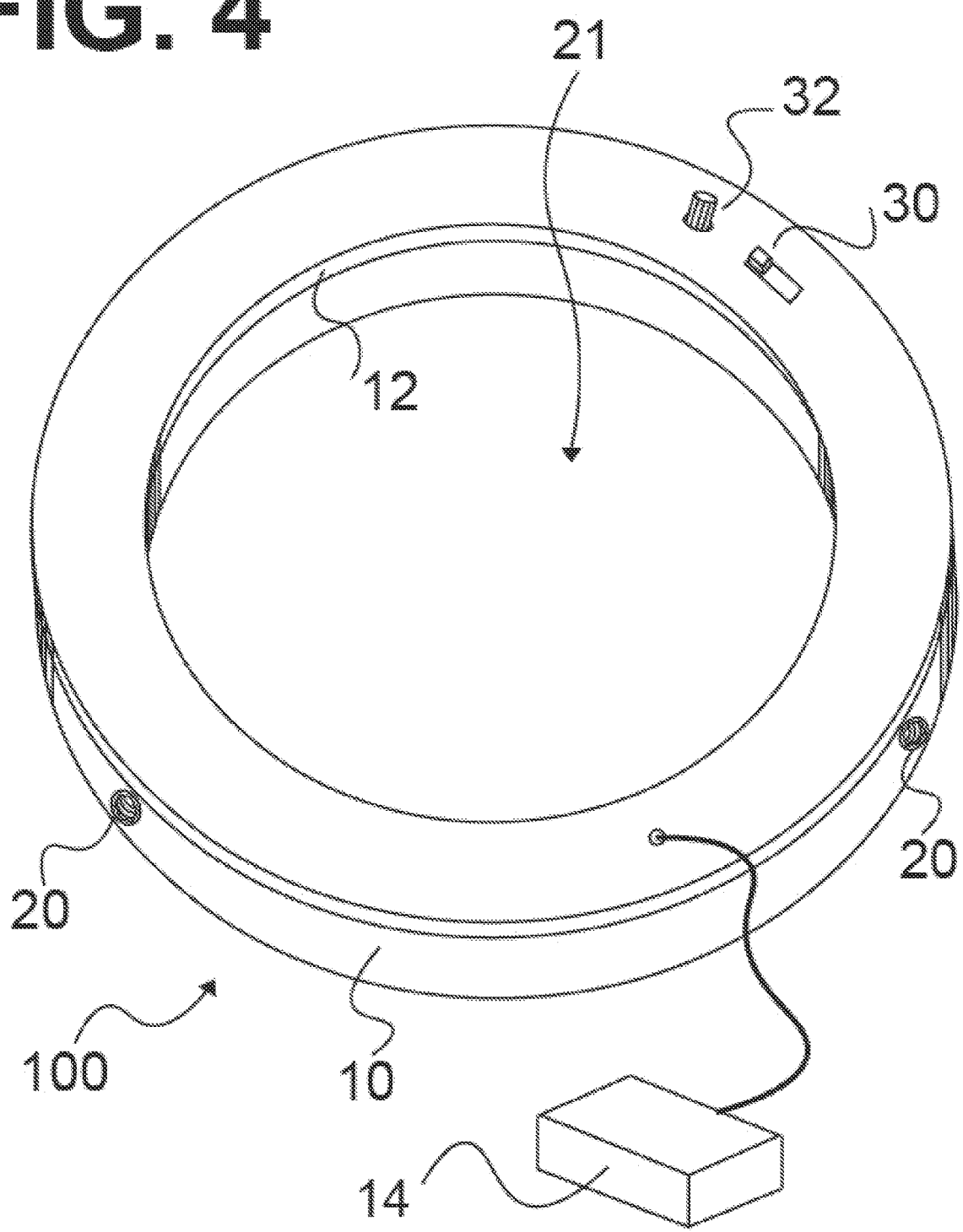
FIG. 4 shows a bottom perspective view of an embodiment of the score activated cornhole light insert.

FIG. 4 shows a bottom perspective view of an embodiment of the score activated cornhole light insert 100 with respect to the circular body 10, the circular lid 12, the power supply 14, the watertight threaded inserts 20, the power switch 30, and the static fade dial 32.

Figure 5:
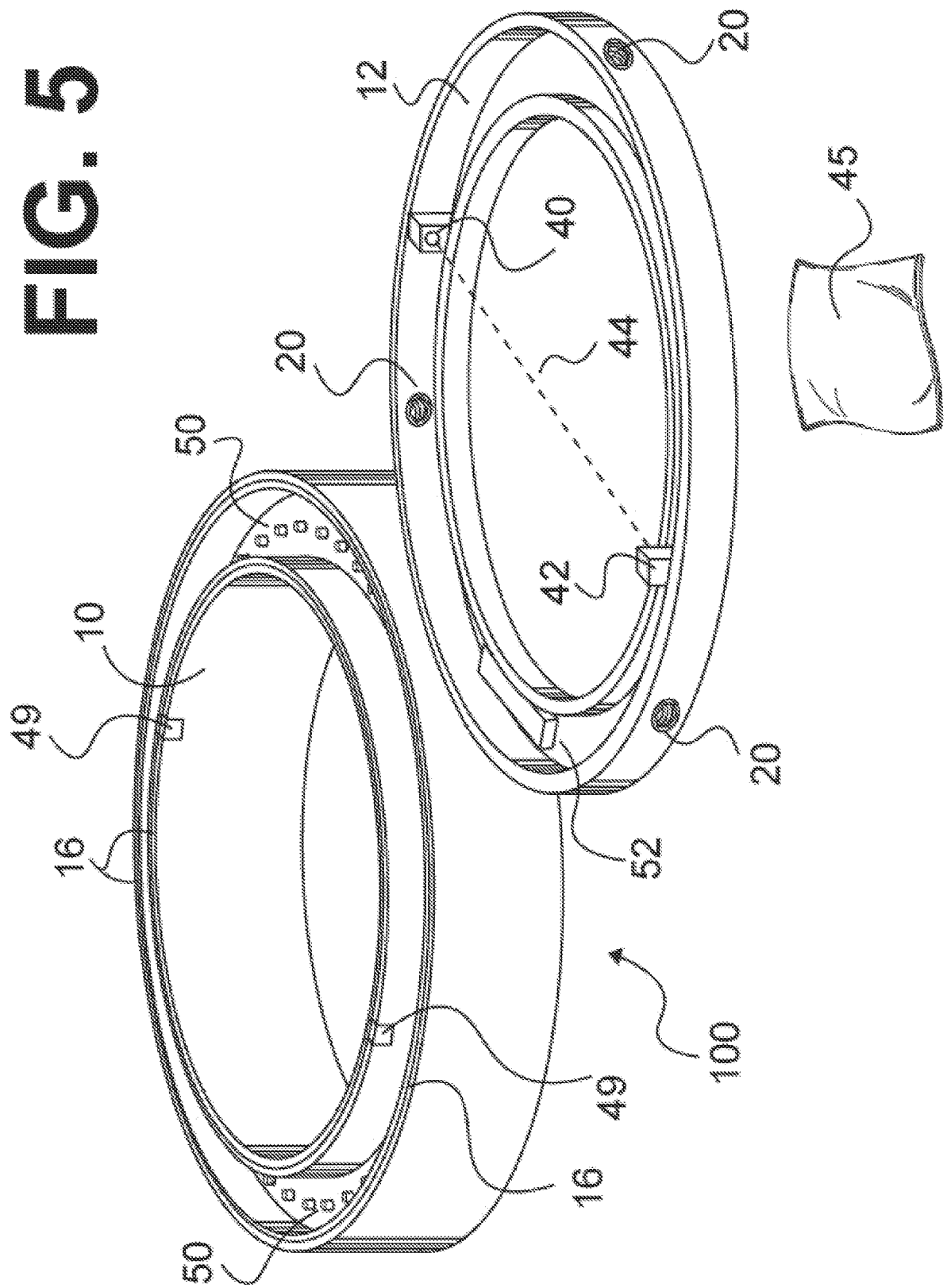
FIG. 5 shows in perspective an embodiment of an internal view of both the circular body and circular lid of the score activated cornhole light insert.

FIG. 5 shows a perspective embodiment of an internal view of both the circular body 10 and the circular lid 12 with respect to the body gaskets 16, the LEDs 50, the microcontroller/components 52, the infrared LED 40, the infrared phototransistor 42, and the infrared break beam 44. Referring now to FIG. 5, the LEDs 50 are placed along a concentric circle halfway between the inner and outer circumference walls of the circular body 10. In this view, the bottoms of the LEDs 50 are shown and light is emitted away from the bottoms to the top of the circular body 10 so as not to impede on the infrared break beam 44. The microcontroller/components 52 will consist of a microcontroller, such as the ATMega328, along with the other electrical components required for operation (see FIG. 10). The microcontroller/components 52 is engineered to detect an interruption of the infrared break beam 44, to indicate the battery level via varied blinking speeds of the LEDs 50, to illuminate the LEDs 50 with a blinking pattern when a bag 45 passes through the score hole 21, and to power down the score activated cornhole light insert 100 after a determined amount of time of inactivity in order to reduce wasted energy. The infrared break beam 44 is comprised of the infrared LED 40 and the infrared phototransistor 42. The infrared break beam 44 will thus not be visible to the naked eye, nor will it be a tangible object, and therefore only present when the score activated cornhole light insert 100 is powered on. When the infrared break beak 44 is interrupted (i.e., when a bag 45 passes through the score hole 21) a signal loss will be detected by the microcontroller/components 52 activating the LEDs 50 with the blinking score pattern.

The infrared LED 40 and the infrared phototransistor 42 will both sit within the circular lid. That is, even though the infrared LED 40 and the infrared phototransistor 42 will be mounted internal on the circular lid 12, the infrared break beam 44 that is subsequently created will be shining through the circular body 10 of the score activated cornhole light insert 100. In addition, in an embodiment where the score activated cornhole light insert 100 is tinted in order to provide different lighting colors, a small area of the circular body 10 coinciding with the location of infrared LED 40 and the infrared phototransistor 42 is made clear so as to not impede the infrared break beam 44. Various opacities were experimented with and it was found that clear mediums were the most reliable to ensure the integrity of the infrared break beam 44. When tinting the circular body 10 and the circular lid 12 it was found to be most efficient to cast the circular body 10 with a roughly one eighth square inch notch missing from the inner wall in front of both the infrared LED 40 and the infrared phototransistor 42 and to then insert, and seal, a watertight clear break beam sight windows 49 to allow the infrared break beam 44 to be completely unobstructed.

The infrared break beam 44 is formed about two inches from the top of the circular body 10 so as to not be triggered by false positives from a bag 45 sliding over the surface of the score hole 21 but not completely falling through. Various depths were experimented with to find the optimal depth that would eliminate most false positives and keep manufacturing costs down. A zero depth is very problematic in that almost all bags 45 that do not fall down the score hole 21 but lie partially over the score hole 21 and partially on the cornhole game board 60 will have a portion of the bag 45 that hangs down into the score hole 21, breaking the infrared break beam 44, and triggering the blinking pattern which is supposed to indicate that the bag 45 has fallen completely through the score hole 21. A depth of one-half inch to one and one-half inches for the infrared break beam 44 still resulted in a range of too many false positives, more so at one-half inch depth and less so at the one and one-half inches depth, but not as many as with the zero-depth option. Very satisfactory results were obtained with the infrared break beam 44 located at a depth between one and one-half inches and two and one-half inches. Depths greater than two and one-half inches improved false positives slightly, but were not deemed worth the additional cost when factoring in the additional material needed to position the infrared break beam 44 at those depths. About two inches in depth appeared to be the optimum depth for eliminating most false positives and minimize manufacturing costs.

One skilled in the art will recognize that two sets or three sets or more of infrared LEDs 40 and the infrared phototransistors 42 could be positioned around circular lid 12 to increase the detection of a bag 45 falling through score hole 21, but after experimentation it was found that a single infrared break beam 44 was invariable triggered by a bag 45 falling though the score hole 21 and that more than one set was not cost justified in light of the nominal improvement in performance.

Figure 6:
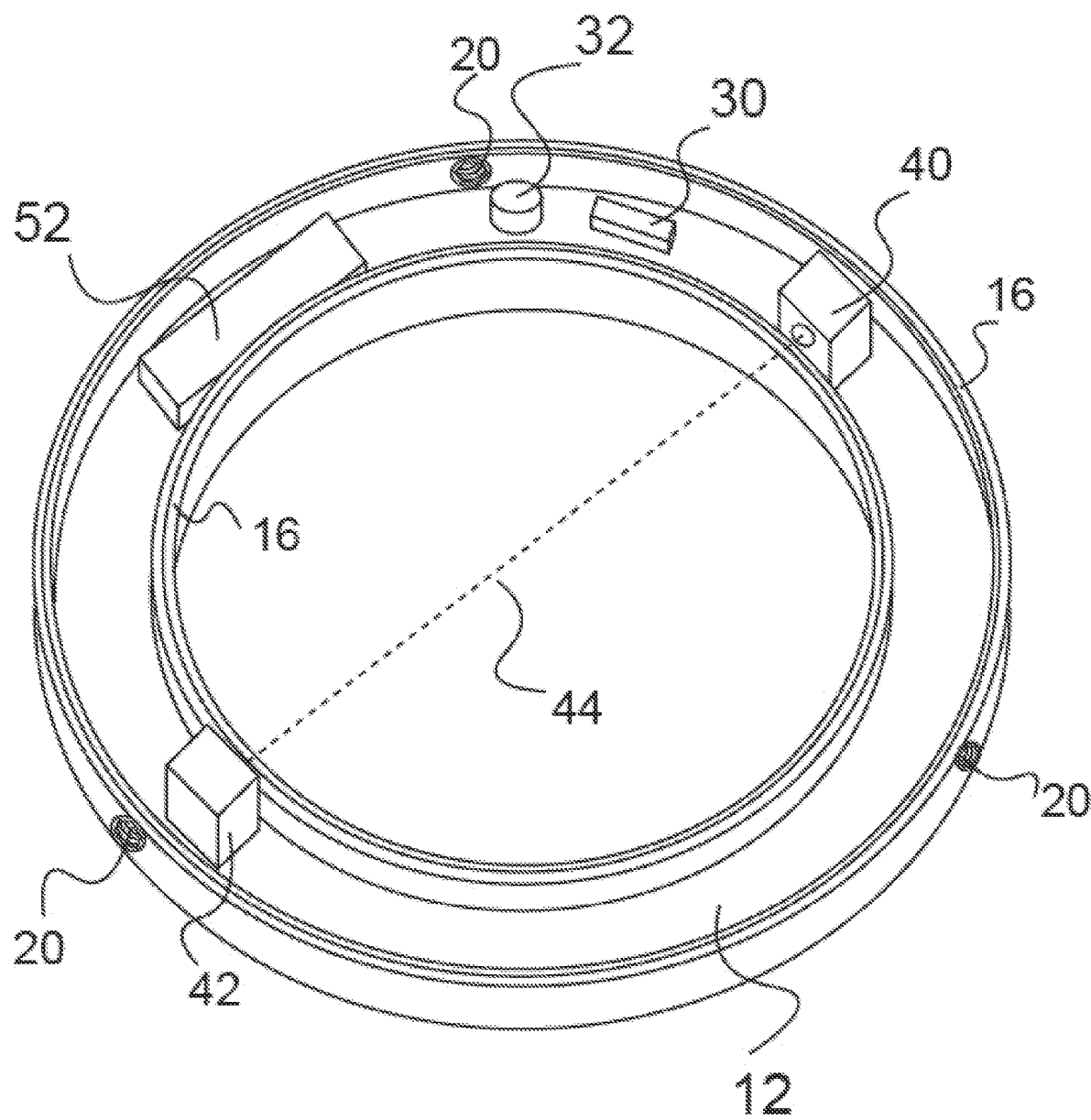
FIG. 6 shows a perspective internal view of an embodiment of the circular lid of the score activated cornhole light insert.

FIG. 6 shows a perspective internal view of an embodiment of the circular lid 12 with respect to the watertight threaded inserts 20, the body gaskets 16, the microcontroller/components 52, the infrared LED 40, the infrared phototransistor 42, the infrared break beam 44, the power switch 30, and the static fade dial 32.

Figure 7:
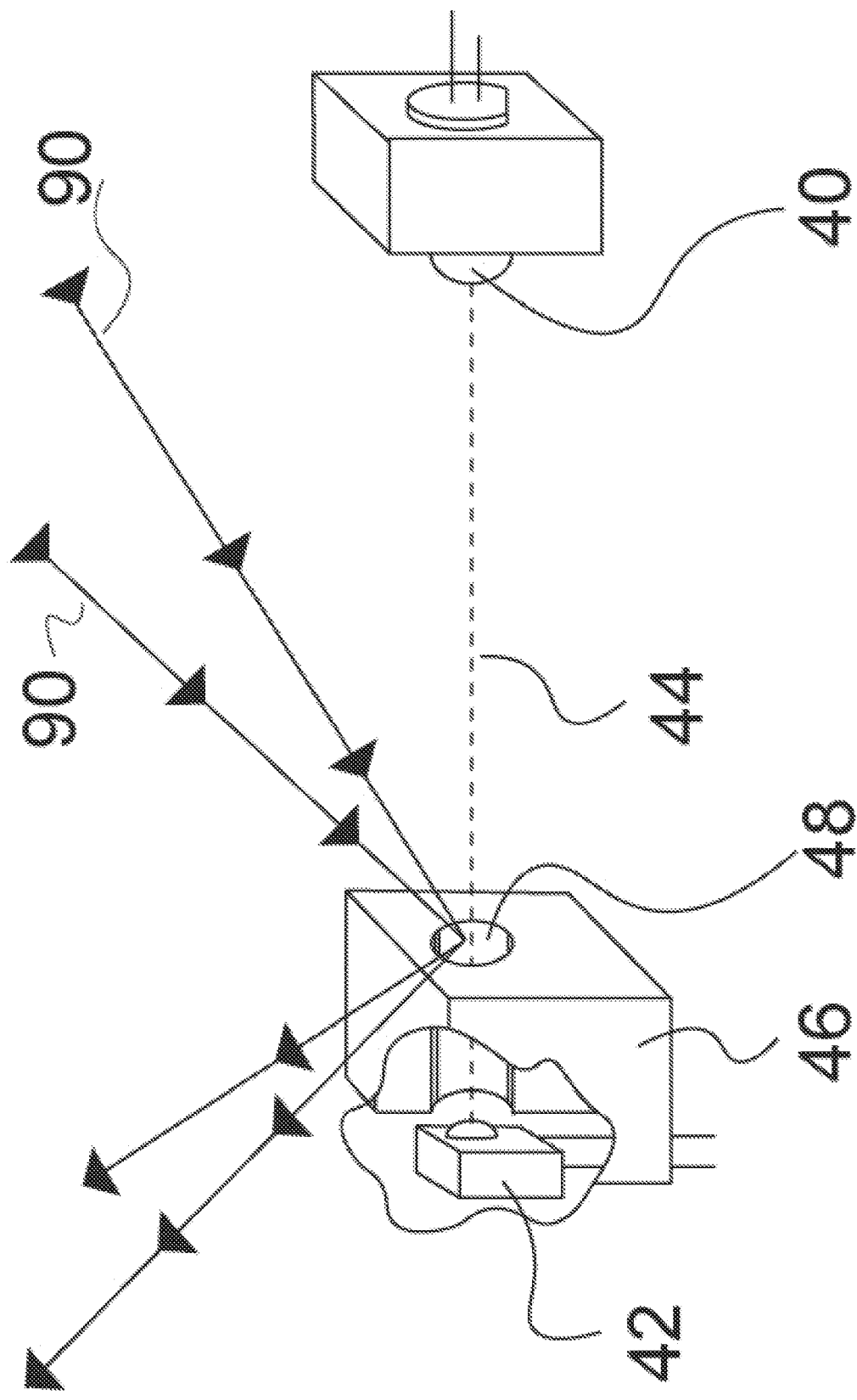
FIG. 7 shows a perspective view of an embodiment of the infrared phototransistor bracket and the infrared glare filter tunnel.

FIG. 7 shows a perspective of the infrared LED 40, the infrared phototransistor 42, the infrared break beam 44, the infrared phototransistor bracket 46, the infrared glare filter tunnel 48, and the infrared containing sunrays 90. Referring now to FIG. 7, the infrared phototransistor 42 is to be set back one quarter inch within the infrared phototransistor bracket 46 and aligned with the infrared glare filter tunnel 48 in order to filter out the infrared containing sunrays 90 which can be reflected around at all different angles. In essence the infrared glare filter tunnel 48 will effectively shroud the infrared break beam 44 so that only infrared light coming from the exact angle of the infrared LED 40 is directed, can reach the infrared phototransistor 42 and not ambient sunlight.

Figure 8:
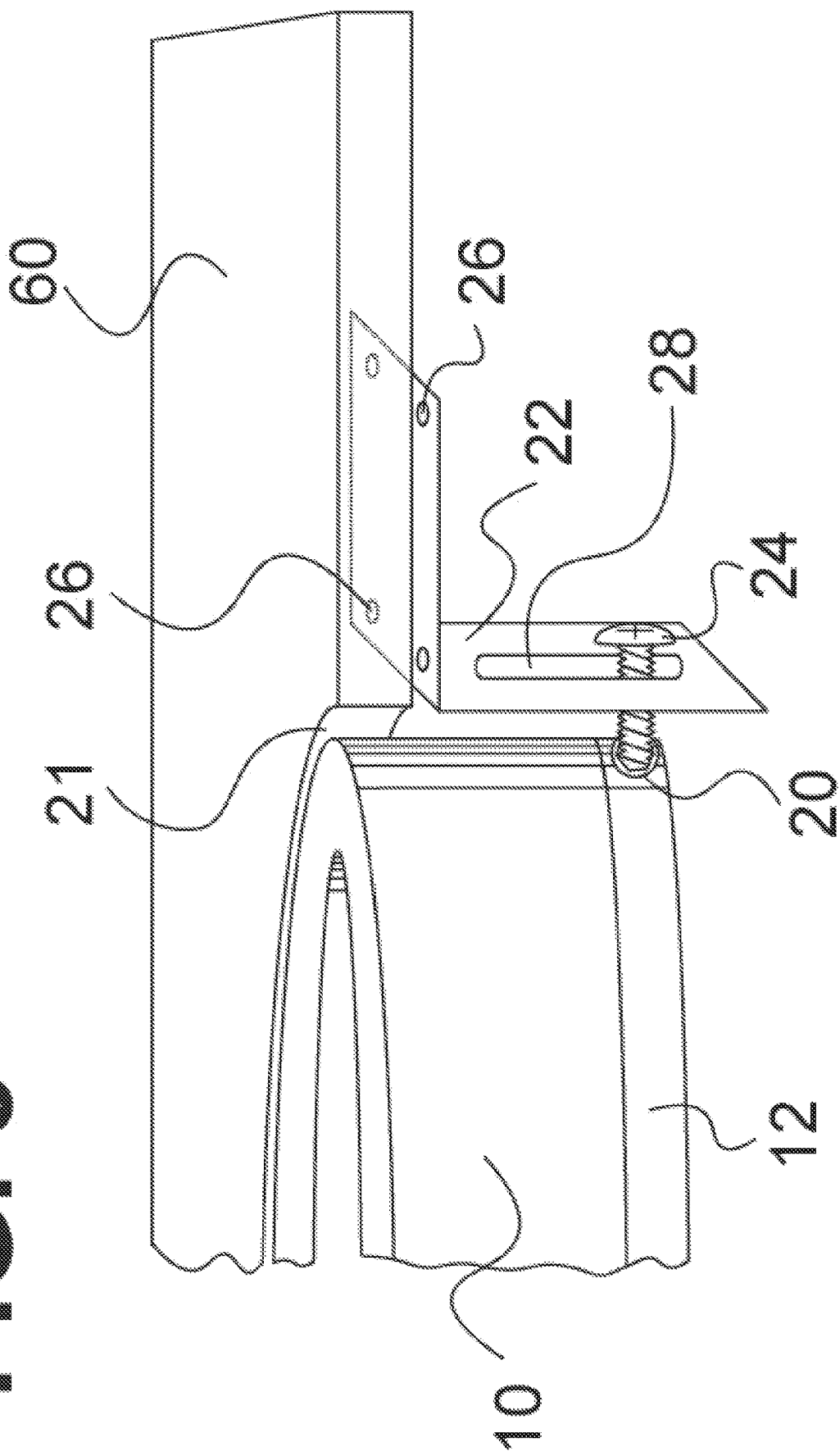
FIG. 8 shows a perspective view of an embodiment of the mounting bracket system used to mount the score activated cornhole light insert to the cornhole game board.

FIG. 8 shows a perspective view of an embodiment of the score activated cornhole light insert 100 mounting hardware that allows the present invention to sit flush with the top of the cornhole game board 60 regardless of the thickness of the cornhole game board 60. Referring now to FIG. 8, the score hole 21 will need to be enlarged to eight inches in diameter in order to accommodate the score activated cornhole light insert 100. After that, the three mounting brackets 22 are to be screwed into place upon the underside of the cornhole game board 60 via the mounting bracket screw holes 26, flush to the edge of the score hole 21 with the height adjustment slot 28 perpendicular to the cornhole game board 60 as to be aligned with the watertight threaded inserts 20. The machine screws 24 are then passed through the height adjustment slot 28 of the mounting bracket 22 into the watertight threaded insert 20 located on the circular lid 12 of the score activated cornhole light insert 100. This method allows the score activated cornhole light insert 100 to be raised or lowered to a height to sit flush with the top of the cornhole game board 60. The power supply 14 in one embodiment is an external unit (see FIG. 3). In another embodiment, the power is onboard unit (now shown). When a recharge or battery replacement is needed in this embodiment, players would be left with an eight-inch score hole 21 when the score activated cornhole light insert 100 is removed, which is significantly greater than the regulation size score hole 21 of six inches. Regulation play would be halted until the score activated cornhole light insert 100 is replaced.

Figure 9:
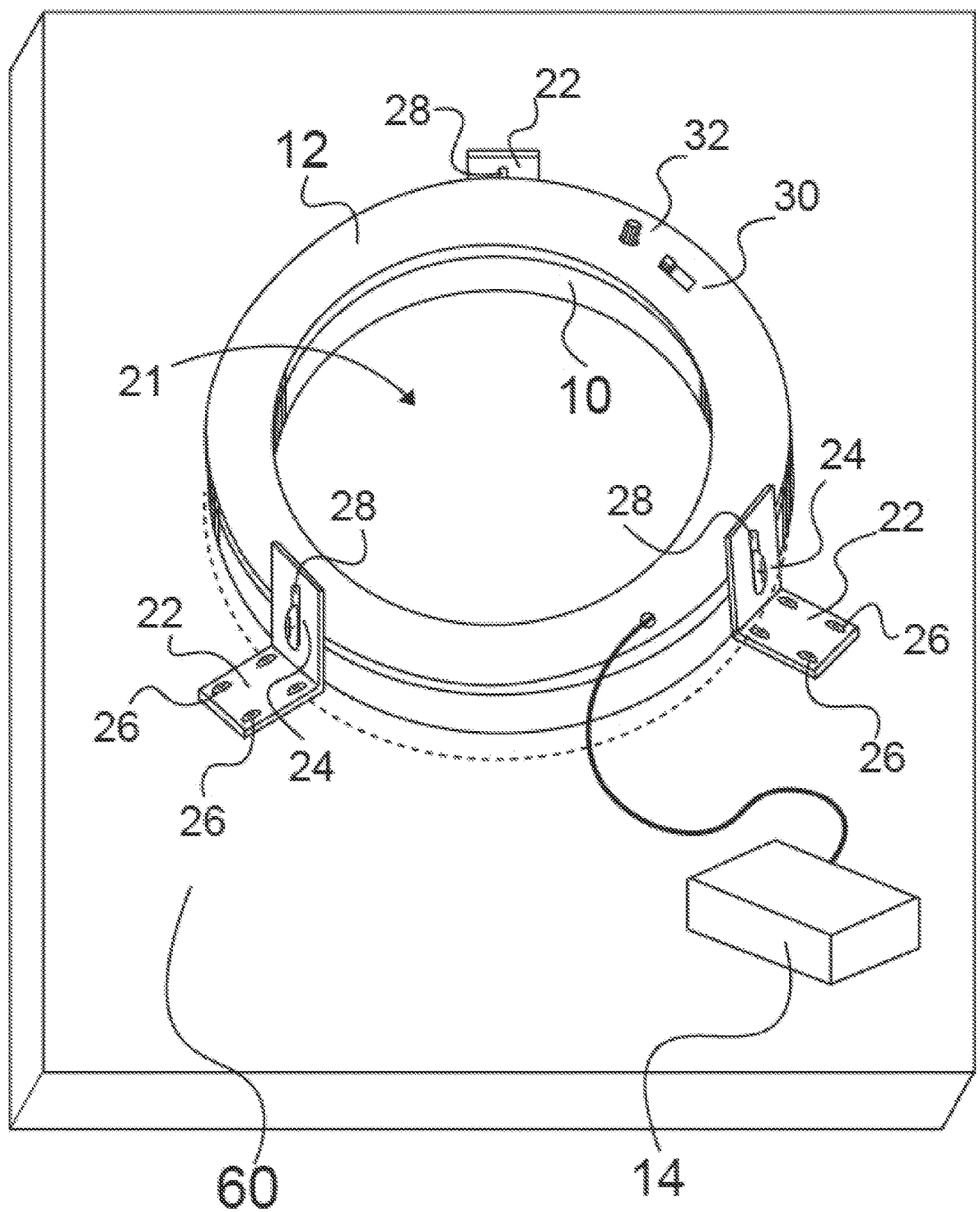
FIG. 9 shows a bottom perspective view of an embodiment of the score activated cornhole light insert mounted to a cornhole game board.

FIG. 9 shows a bottom perspective view of an embodiment of the score activated cornhole light insert 100 and the power supply 14 both mounted to the underside of the cornhole game board 60.

Figure 10:
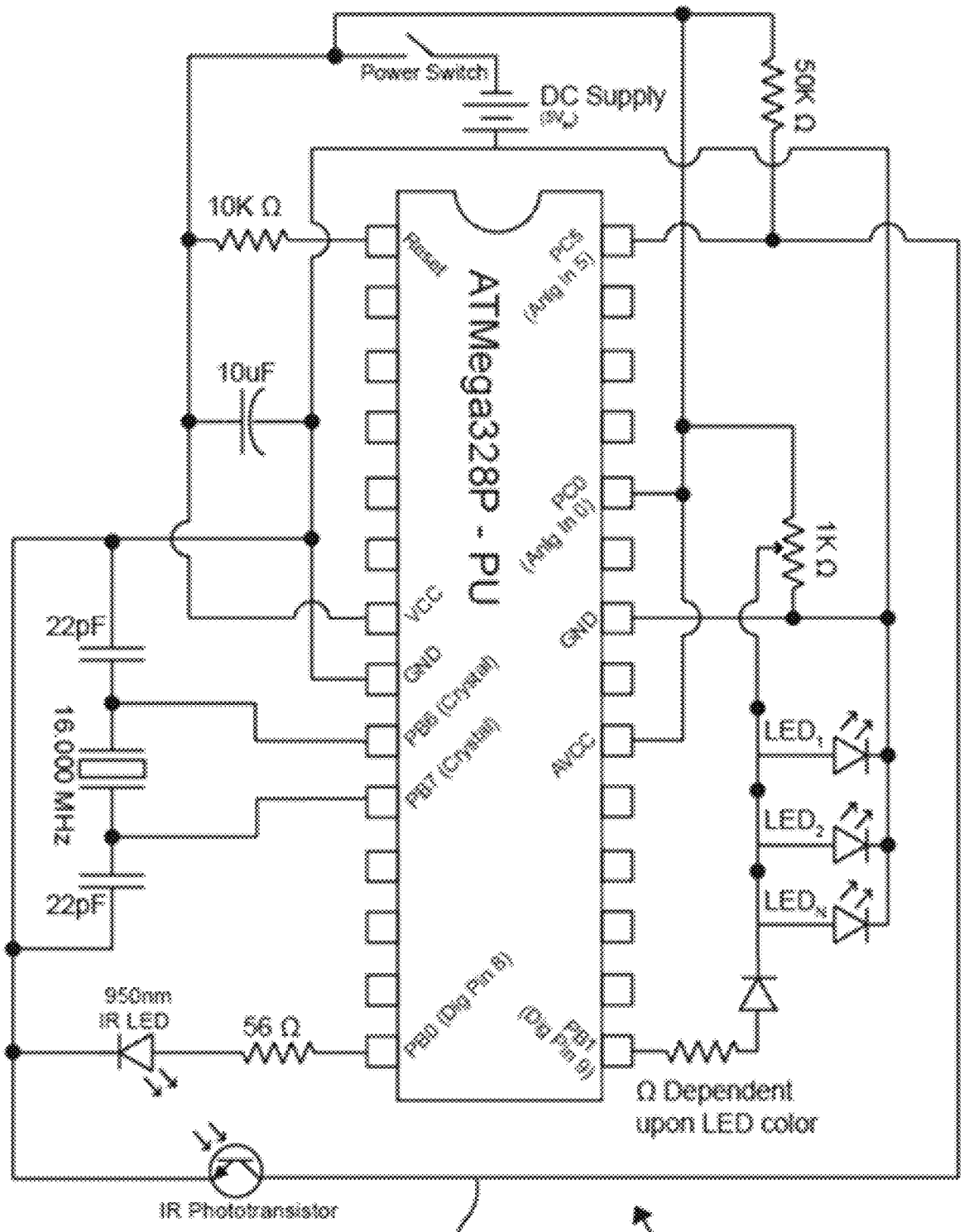
FIG. 10 shows an embodiment of an electrical schematic of the score activated cornhole light insert.

FIG. 10 shows an embodiment of an electrical schematic 70 of the score activated cornhole light insert 100. The circuit is designed to provide a multitude of functions. First, the circuit has been designed to run a microcontroller/components 52, such as an ATMega328 microcontroller and the other electrical components shown, in order to execute a series of coded programs. The first of these coded programs is to measure the charge of the power supply 14, and then indicate that charge back to the user through a series of blinking speeds via the LEDs 50—the faster the blink the lower the supply voltage. Secondly, the microcontroller has been coded to display a separate blinking pattern specifically for when a player makes a bag 45 through the score hole 21. Lastly, the microcontroller has been coded to automatically power off after a predetermined period of time of inactivity in order to save power. In conjunction with the microcontroller, the circuit has been designed to power an infrared LED 40, which emits an infrared light directly into the infrared phototransistor 42. The infrared phototransistor 42 is in turn engineered to detect infrared signal interruptions from the infrared LED 40 when an object passes in between the two, such as a tossed bag 45. This process thus creates the infrared break beam 44. Furthermore, the LEDs 50 have been configured to receive power from both the microcontroller/components 52 when a player scores, as well as directly from the power supply 14 via the static fade dial 32 potentiometer in order to provide the option to illuminate the LEDs 50 regardless of if the infrared break beam 44 has detected a bag 45 passing through the score hole 21.

Figure 11:
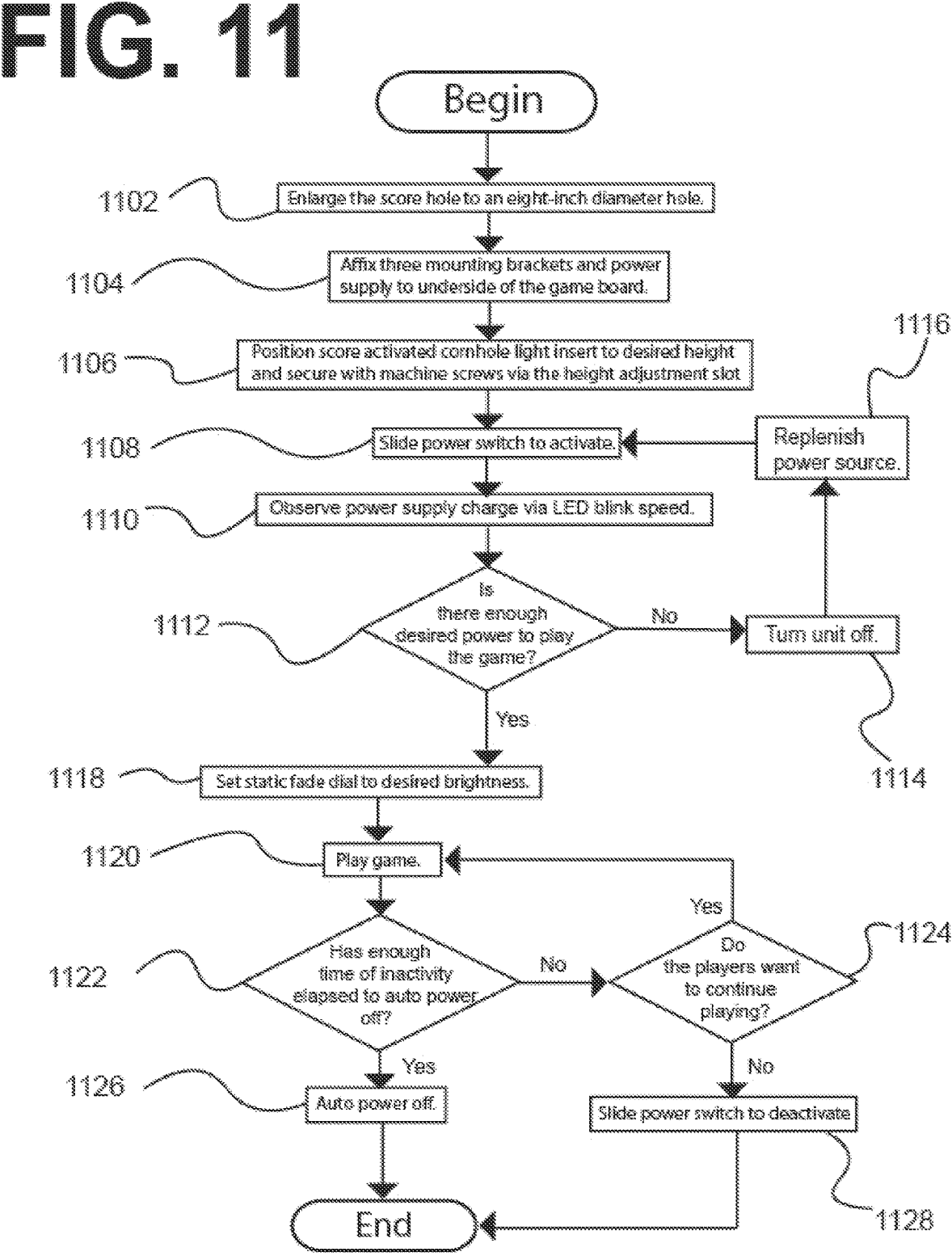
FIG. 11 shows a flow chart of an embodiment of the operation of the score activated cornhole light insert.

FIG. 11 shows a flow chart of an embodiment of the method of utilizing the score activated cornhole light insert 100 with an existing cornhole game board 60. The method begins in step 1102 where the existing six-inch diameter hole in the existing cornhole game board 60 is enlarged to an eight-inch diameter hole.

Next, in block 1104 the three mounting brackets 22 are evenly spaced around, and flush to, the score hole 21. The mounting brackets 22 are then affixed to the underside of the cornhole game board 60, via the mounting bracket screw holes 26, with the height adjustment slot 28 perpendicular to the cornhole game board 60 as to be aligned with the watertight threaded inserts 20 located on the circular lid 12 of the score activated cornhole light insert 100. The power supply 14 as well is secured to the underside of the cornhole game board 60 and away from the score hole 21 so as to not interfere with, or be damaged by, game play.

Next, in block 1106 the score activated cornhole light insert 100 is held in position while the machine screws 24 are passed through the height adjustment slot 28 and into the watertight threaded inserts 20. The top of the score activated cornhole light insert 100 is then held flush with the top of the cornhole game board 60 while the machine screws 24 are then tightened down, locking the score activated cornhole light insert 100 into the proper height.

Next, in block 1108 the user powers on the score activated cornhole light insert 100 on via the power switch 30. Next, in block 1110 the score activated cornhole light insert 100 will display different blinking speeds to indicate the power level of the score activated cornhole light insert 100—the faster the blink the lower the supply voltage.

Next, in block 1112 a decision needs to be made if the power level is satisfactory. If the power supply 14 voltage is too low, then the score activated cornhole light insert 100 needs to be turned off as indicated by block 1114 and the power supply 14 needs to be recharged or the batteries need to be replaced as indicated in block 1116. The method then returns to block 1108.

Returning to block 1112, if the power level is satisfactory, then the user proceeds to block 1118 where the static fade dial 32 is set to desired background brightness, if one is desired at all.

Next, in block 1120 the game is played. During game play, and as depicted in block 1122, the microcontroller/components 52 will continually monitor the time elapsed of inactivity (i.e., time elapsed without an interruption to the infrared break beam 44). If block 1122 returns a "yes" then the process will proceed to block 1126 and the score activated cornhole light insert 100 will auto power off. (It is important to note that the time elapsed of inactivity required to auto power off will be far greater than the average amount of time without any player scoring, as to not accidentally auto power off during a slow scoring game.)

If block 1122 returns a "no" then the process moves on to block 1124. In block 1124, if the players want to continue playing, then the game continues. If, however, it hasn't been enough time for the score activated cornhole light insert 100 to auto power off and the players do not want to continue playing then in block 1128 the users manually turn off the score activated cornhole light insert 100 and the method ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and circuitry and widely differing embodiments and applications will suggest themselves without departing from the scope of the disclosed subject matter.

What is claimed is:

1. A score activated cornhole light insert comprising:
    a circular body having a top side, a bottom side, an outer wall, and an inner wall;
    a circular lid having a top side, a bottom side, an outer wall, and an inner wall, the top side of the circular lid mates with and is attachable to the bottom side of the circular body;
    a score hole formed by the inner walls of the circular body and the circular lid;
    a microcontroller/components fixed within the circular lid;
    a power supply in electrical communication with the microcontroller/components;
    an infrared LED located interior to the circular lid;
    an infrared phototransistor located interior to the circular lid and directly opposite of the infrared LED such that an infrared break beam is formed between the infrared LED and the infrared phototransistor across the score hole when powered on by the power supply, wherein the infrared break beam is formed between about one and one-half inches to two and one-half inches below the top side of the circular body; and
    a plurality of LEDs fixed within the circular body wherein a bag that falls through the score hole breaks the infrared break beam causing the microcontroller/components to cause the plurality of LEDs to emit light through the top side of the circular body.

2. The score activated cornhole light insert according to claim 1 wherein the infrared break beam is formed about two inches below the top side of the circular body.

3. The score activated cornhole light insert according to claim 1 wherein circular body and circular lid are cast from a clear or tintable casting agent in order to allow light from the plurality of LEDs to pass through while also not impeding upon the infrared break beam.

4. The score activated cornhole light insert according to claim 1 further comprising:
    a power switch for connecting the power supply to the microcontroller/components; and
    a static fade dial for setting the plurality of LEDs to a constant background light of desired brightness ranging from zero illumination to full illumination.

5. The score activated cornhole light insert according to claim 4 wherein the power supply further comprises:
    a battery, wherein the microcontroller/components causes the plurality of LEDs to blink at a plurality of differentiated blinking speeds to indicate a battery power level within the first few seconds after the power switch is turned on.

6. The score activated cornhole light insert according to claim 1 wherein the microcontroller/components causes the plurality of LEDs to emit a blinking pattern of light when the bag falls through the score hole.

7. The score activated cornhole light insert according to claim 1 further comprising:
    a phototransistor bracket having an infrared glare filter tunnel wherein the phototransistor bracket houses the infrared phototransistor in a set back position and aligned with the infrared glare filter tunnel in order to filter out infrared containing sunrays.

8. The score activated cornhole light insert according to claim 1 wherein the circular body further comprises:
    a first clear break beam sight window positioned in the inner wall of the circular body in front of the infrared LED; and
    a second clear break beam sight window positioned in the inner wall of the circular body in front of the infrared phototransistor to allow the infrared break beam to be completely unobstructed by the inner wall of the circular body.

9. The score activated cornhole light insert according to claim 1 further comprising:
- a first body gasket that aligns with the outer walls of the circular body and the circular lid; and
- a second body gasket that aligns with the inner walls of the circular body and the circular lid to form a watertight structural seal when the circular body and the circular lid are attached.

\* \* \* \* \*